United States Patent [19]
Nakamura

[11] Patent Number: 4,611,351
[45] Date of Patent: Sep. 9, 1986

[54] BEARING MOUNTING DEVICE
[75] Inventor: Shinya Nakamura, Maebashi, Japan
[73] Assignee: Nippon Seiko Kabushiki Kaisha, Tokyo, Japan
[21] Appl. No.: 728,022
[22] Filed: Apr. 29, 1985
[30] Foreign Application Priority Data
  May 10, 1984 [JP] Japan .............................. 59-67140[U]
[51] Int. Cl.⁴ .............................................. F16C 27/00
[52] U.S. Cl. ...................................... 384/99; 384/510; 384/517; 384/556
[58] Field of Search ................... 384/556, 99, 510, 517, 384/537

[56] References Cited
U.S. PATENT DOCUMENTS

| | | | |
|---|---|---|---|
| 3,304,139 | 2/1967 | Toth et al. | 384/556 |
| 3,558,199 | 1/1971 | Raiser et al. | 384/556 |
| 3,799,636 | 3/1974 | Kersting et al. | 384/556 |

FOREIGN PATENT DOCUMENTS
57-173931 11/1982 Japan .

Primary Examiner—Lenard A. Footland
Attorney, Agent, or Firm—Shapiro and Shapiro

[57] ABSTRACT

This specification discloses a bearing mounting device in which while the hydraulic pressure in a hydraulic mechanism for applying a preload to a bearing is being adjusted in a state in which the fixing sleeve of a fixing mechanism for fixing the bearing to a shaft has been expanded by hydraulic pressure, a predetermined preload is applied to the bearing through a spacer provided between the fixing mechanism and the hydraulic mechanism and through the fixing mechansim. The hydraulic pressure in the fixing mechanism is released with the predetermined preload being applied and the fixing sleeve is fixed to the shaft, whereby the bearing is fixed in its appropriately preloaded state.

3 Claims, 2 Drawing Figures

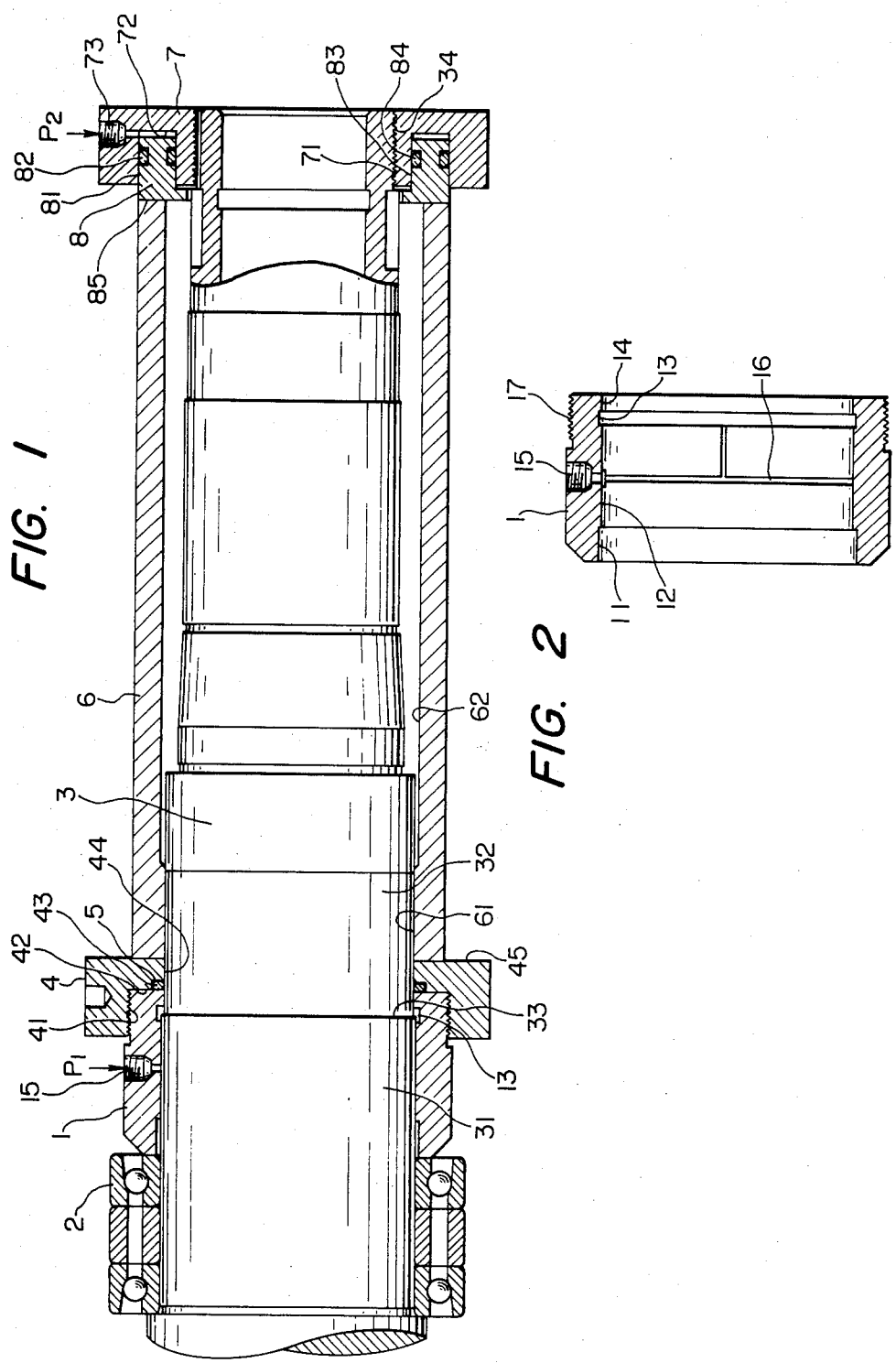

BEARING MOUNTING DEVICE

BACKGROUND OF THE INVENTION

1. Field of the Invention

This invention relates to a device for expanding a fixing sleeve by the use of a hydraulic pressure to impart a predetermined pressure to a bearing and fix the bearing, and for releasing said hydraulic pressure in a state in which a required pressure force is caused to act axially, thereby mounting the bearing in a state in which a preload is applied thereto.

2. Description of the Prior Art

Heretofore, where a double row angular ball bearing provided with a seat is to be mounted, for example, on a spindle unit by applying a preload to the bearing, the bearing has been fixed onto the spindle with the inner race thereof being tightened by rotatively displacing a nut threadably engaged with a shaft. However, when the inner race is tightened by the nut, a high load of 3 to 4 tons is immediately created and one could not know by what degree of force the inner race is actually tightened.

Also, it has been thought that there is little or no variation in the dimensions of the inner race spacer inserted between the inner races of the double row angular ball bearing provided with the spacer, but it has been found that the dimensions of the spacer are actually varied by the deformation of the spacer, the destruction of the contact surface or the like when a great load is applied thereto during the preload of the bearing.

Accordingly, even when a preset preload appropriate to the bearing has presumably been applied it has sometimes been the case that a preload two to three times the preset preload is actually applied.

Even when a preload greater than the preset preload has been applied as described above, the influence thereof is small if the rotation of the spindle is not so fast, that is, the rotational speed of the bearing is in a low or medium speed range (500,000 dmn or less). However, when the rotational speed of the bearing is 600,000 dmn or more as has been experienced recently, the great temperature rise by an excessively great preload and further the possibility of seizure or the like have offered problems and stable highspeed rotation could not be obtained.

SUMMARY OF THE INVENTION

It is an object of the present invention to provide a device for mounting a bearing to a partner member in a state in which a predetermined preload is imparted thereto when the bearing is to be mounted on the partner member.

The present invention involves a bearing mounting device in which while the hydraulic pressure in a hydraulic mechanism for applying a preload to a bearing is being adjusted in a state in which the fixing sleeve of a fixing mechanism for fixing the bearing to a partner member such as a shaft has been expanded by hydraulic pressure, a predetermined preload is applied to the bearing through a spacer provided between the fixing mechanism and the hydraulic mechanism and through the fixing mechanism. The hydraulic pressure in the fixing mechanism is released with the predetermined preload being applied and the fixing sleeve is fixed to the shaft, whereby the bearing is fixed in its appropriately preloaded state.

According to the present invention, a predetermined preload corresponding to the number of revolutions can be imparted to the bearing while pressurized oil is supplied to the hydraulic mechanism and its pressure is adjusted. The bearing adjusted to the predetermined preload increases its rigidity and can fully display its function while maintaining high accuracy, and high-speed revolution of 800,000 dmn or more becomes possible. Further, the irregularity of the preload during mass production is small and control is simple and, when the mounting of the bearing is terminated with the application of the preload being completed, all of the members except the fixing sleeve can be removed so that the instrument or apparatus on which the bearing is mounted can be made compact.

BRIEF DESCRIPTION OF THE DRAWINGS

FIG. 1 is a cross-sectional view of a device according to an embodiment of the present invention.

FIG. 2 is a cross-sectional view of the fixing sleeve in FIG. 1.

DESCRIPTION OF THE PREFERRED EMBODIMENT

An embodiment of the present invention will hereinafter be described by reference to the drawings. FIG. 1 shows a state in which a bearing is preloaded and fixed to a shaft by the device of the present invention. In FIG. 1, reference numeral 1 designates a fixing sleeve of a fixing device, reference numeral 2 denotes an angular ball bearing provided with spacers, and reference numeral 3 designates a shaft on which the bearing 2 and the fixing sleeve 1 are mounted.

This shaft 3 has a large-diametered portion 31 and a medium-diametered portion 32 having a slightly smaller diameter than the large-diametered portion 31, and a stepped portion 33 is formed at the juncture of the two portions. A threaded portion 34 is formed on the outer diameter of the right-hand side as viewed in FIG. 1. In the fixing sleeve 1, as shown in FIG. 2, a gap maintaining inner diameter surface 11 finished to an inner diameter dimension somewhat greater than the diameter of the large-diametered portion 31 of the shaft 3 so as to create a slight gap relative to the large-diametered portion 31 is formed on the side adjacent to the bearing 2. A fixed inner diameter surface 12 which will provide a tight fit relative to the large-diametered portion 31 of the shaft 3 is provided continuous to the gap maintaining inner diameter surface 11. A circumferential groove-like oil pocket portion 13 is provided continuous to the fixed inner diameter surface 12 at a location corresponding to the stepped portion 33 of the shaft 3, and a gap forming inner diameter surface 14 is provided continuous to the oil pocket portion 13. An oil hole 15 for supplying pressurized oil is formed substantially at the axially central portion of the fixing sleeve 1. An oil groove 16 communicating between the oil hole 15 and said circumferential groove-like oil pocket portion 13 is provided in the fixed inner diameter surface 12, and a threaded portion 17 of relatively small pitch is provided on the outer diameter of the fixing sleeve. A sleeve nut 4 having an internally threaded portion 41 for threadably engaging the threaded portion 17 of the fixing sleeve has on the outer side surface 42 thereof an O-ring fixing portion 43 which cooperates with the fixing sleeve 1 to mount an O-ring 5, and the inner diameter surface 44 of the sleeve nut 4 corresponding to the small-diametered portion 32 of the shaft 3 has an inner diameter dimension which permits a small gap to be formed relative to the small-diametered portion 32. The fixing sleeve 1, the sleeve nut 4 and the O-ring 5 together constitute a bearing fixing device.

A spacer 6 which is in contact with the side surface 45 of the sleeve nut 4 has a length corresponding to that of the shaft 3 and is provided with an inner diameter portion 61 loosely fitting to the medium-diametered portion 32 and a large-diametered portion 62 having a diameter somewhat larger than the diameter of the inner diameter portion 61. A bearing preload hydraulic mechanism engaged with the right end of the shaft 3 as viewed in FIG. 1 comprises chiefly an internally threaded portion 71 threadably engaged with the threaded portion 34 of the shaft 3, a hydraulic nut 7 having a groove portion 72, etc., and a pressing sleeve 8 engaged with the groove portion 72 of the hydraulic nut 7.

The groove portion 72 of the hydraulic nut 7, in FIG. 1, is a circumferential groove of U-shaped cross-section and is formed with a hole 73 for supplying pressurized oil. The pressing sleeve 8 engaged with the groove portion 72 of the hydraulic nut 7 is provided with a groove for mounting an O-ring 82 therein on the outer peripheral portion 81 thereof and is provided with a groove for mounting an O-ring 84 therein on the inner peripheral portion 83 thereof. The left end surface 85 of the pressing sleeve 8 as viewed in FIG. 1 is formed so as to be in contact with the side surface of said spacer 6 during the supply of pressurized oil.

To and fix the bearing 2 to the shaft 3 by the use of the above-described device, the fixing sleeve is first heated and expanded to fit on the shaft 3, and the temperature of the fixing sleeve 1 is reduced to the normal temperature with the end surface of the fixing sleeve 1 being in contact with the bearing 2. Then the O-ring 5 is mounted on the shaft 3, and the sleeve nut 4 is brought into intimate contact with the O-ring 5 as shown in FIG. 1 and is rotated and threadably engaged with the threaded portion 17 of the fixing sleeve 1 until the O-ring is deformed.

Subsequently, the spacer 6 is mounted so as to be in contact with the side surface of the sleeve nut 4, and further the hydraulic nut 7 of the hydraulic mechanism, together with the pressing sleeve 8, is threadably engaged with the threaded portion 34 of the shaft 3 and is rotated until the end surface 85 of the pressing sleeve comes into contact with the spacer 6, thereby bringing about the state as shown in FIG. 1.

When the mounting as described above is completed, pressurized oil P1 is supplied to the oil hole 15 from the hydraulic pressure generating source, not shown, whereupon the pressurized oil P1 is forced into the oil pocket portion 13 through the oil groove 16, and the oil pocket 13 is expanded with the pressurized oil being supplied thereto. At the same time, the fixed inner diameter surface 12 is also expanded to form a very slight gap between it and the large-diameterd surface 31 of the shaft 3. In this state, pressurized oil P2 is then supplied to the supply hole 73 of the hydraulic nut 7 of the pre-loading hydraulic mechanism from a hydraulic source, not shown. By this pressurized oil P2, the pressing sleeve 8 is displaced leftwardly as viewed in FIG. 1 and the inner race of the bearing is pressed through the action of the spacer 6, the sleeve nut 4 and the fixing sleeve 1 and thus, the bearing 2 is preloaded.

The pressure of the pressurized oil P2, or in other words, the force which presses the inner race of the bearing 2, is adjusted so that it can overcome the tightening force of the portion of contact between the fixing sleeve 1 and the large-diametered portion 31 of the shaft 3 and the rightward force of the pressurized oil P1 caused by the level difference between the large-diametered portion 31 and the medium-diametered portion 32 of the shaft 3, so that a preload can be applied to the bearing.

When the adjustment of the preload is completed, the supply state of the pressurized oil P1 is released with the preload being applied. When the supply of the pressurized oil is stopped, the fixing sleeve 1 returns from its expanded condition to its normal condition and the fixed inner diameter surface 12 tightly fits relative to the large-diametered portion 31 of the shaft 3. Thus the bearing 2 is fixed in a state in which a predetermined preload is applied thereto.

Subsequently, the pressurized oil P2 for pre-loading the bearing 2 is released, and the hydraulic nut 7 is rotated to detach from the shaft 3 the hydraulic mechanism for pre-loading the bearing and remove the seat 6.

Further, the sleeve nut 4 of the fixing mechanism is rotated to detach the sleeve nut 4 and the O-ring 5 from the shaft 3 and thus, the preload-mounting of the bearing 2 is completed.

I claim:

1. A device for mounting a bearing on a shaft with an axial preload comprising:

a sleeve tightly fixed on the shaft to hold the bearing in an axially preloaded state, the sleeve having an inner periphery with such a diameter that the sleeve is tightly fitted on the shaft, a first circumferential oil groove formed in the inner periphery, a second circumferential oil groove formed in the inner periphery axially apart from the first oil groove, a third oil groove communicating between the first and second oil grooves and a hole formed through the sleeve to supply a first pressurized oil to the first oil groove;

a mechanism for applying the axial preload to the bearing, the mechanism including a cylindrical member fitted on the shaft and having an annular recess open axially toward said sleeve and a hole in communication with the recess to supply a second pressurizsed oil to the recess, and annular means including a piston member for extending between the sleeve and cylindrical member, one end of the annular means being received in the recess and another end of the annular means being abutted with the sleeve, whereby when the bearing is mounted on the shaft, the first pressurized oil may be supplied to the first oil groove of the sleeve through the hole of the sleeve to expand the sleeve radially, the second pressurized oil may then be supplied to the recess of the cylindrical member through the hole of the cylindrical member so that the annular means including the piston member is moved axially to apply a preload to the bearing, the pressure of the first pressurized oil may then be released from the first oil groove so that the sleeve returns to its original state while still applying the second pressurized oil to the recess, and thereafter the pressure of the second pressurized oil may be released from the recess.

2. A hydraulic mechanism for applying a preload to a bearing to be held stationary on an elongate shaft at a remote portion from an end portion of the shaft by a first sleeve fixed on the shaft to hold the bearing in an axially preloaded state, the first sleeve having an inner periphery with such a diameter that the sleeve is tightly fitted on the shaft, a first circumferential oil groove formed in the inner periphery, a second circumferential oil groove formed in the inner periphery axially apart from the first oil groove, a third oil groove communicating between the first and second oil grooves and a first hole formed through the first sleeve to supply a first pressurized oil to the first oil groove, said hydraulic mechanism including a cylindrical member removably fixed on the shaft at said end portion and having an annular recess open axially toward the first sleeve and a second hole in communication with the recess to supply a second pressurized oil to the recess, an annular piston member received in the recess and slidable axially, and means including an elongate second sleeve removably fitted on the shaft for abutting the first sleeve and the piston member at respective ends of said means, said means providing that when the bearing together with the hydraulic mechanism is mounted on the shaft, the first pressurized oil may be supplied to the first oil groove of the first sleeve through the first hole to expand the first sleeve radially, and the second pressurized oil may then be supplied to the recess of the cylindrical member through the second hole so that the piston member is moved axially to apply a preload to the bearing through the second sleeve, whereupon the pressure of the first pressurized oil may be released from the first oil groove so that the first sleeve returns to its original state while still applying the second pressurized oil to the recess, and then the pressure of the second pressurized oil may be released, the hydraulic mechanism thereafter being removable from the shaft.

3. A bearing mounting device comprising a fixing sleeve for mounting a bearing on a shaft, a sleeve nut threadably engaged with said fixing sleeve, a spacer fitted to said shaft, and a hydraulic mechanism for preloading the bearing through said spacer, said sleeve nut and said fixing sleeve; said fixing sleeve being provided with a gap maintaining inner diameter surface having an inner diameter dimension such that during fixing of said sleeve on said shaft a gap is created between the gap maintaining inner diameter surface and said shaft, a fixed inner diameter surface continuous to said gap maintaining inner diameter surface and having such an inner diameter dimension as to be closely fitted to said shaft during the fixing of said fixing sleeve, a circumferential groove-like oil pocket portion continuous to said fixed inner diameter portion and provided at a location corresponding to a stepped portion of said shaft, a gap forming inner diameter surface continuous to said oil pocket portion, a hydraulic oil hole, an oil groove communicating with said oil hole and said circumferential groove-like oil pocket portion, and a threaded outer diameter portion at one end of said fixing sleeve; said sleeve nut having an internally threaded portion threadably engaged with the threaded portion of said fixing sleeve, a first side surface with a sealing member fixing portion which cooperates with said fixing sleeve to mount a sealing member, and a gap maintaining inner diameter surface; said spacer being in contact with a second side surface of said sleeve nut and having a length corresponding to the length of said shaft and an inner diameter surface loosely fitted to said shaft; said hydraulic mechanism for applying a preload to said bearing including an internally threaded portion threadably engaged with a threaded portion of said shaft, a hydraulic nut having a groove portion and a pressurized oil supply hole communicating with said groove portion, and a pressing sleeve engaged with the groove portion of said hydraulic nut and having sealing members respectively engaging the inner peripheral portion and the outer peripheral portion thereof and further having one side surface formed so as to press a side surface of said spacer during the supply of pressurized oil to said oil supply hole; all of said members except said fixing sleeve being removable from said shaft after said fixing sleeve is fixed to said shaft.

* * * * *